(12) United States Patent
Caumartin et al.

(10) Patent No.: US 11,022,189 B2
(45) Date of Patent: Jun. 1, 2021

(54) HYDRAULIC PUMP FOR A HYDRAULIC CONNECTION INTERFACE OF A CLUTCH MECHANISM

(71) Applicant: VALEO EMBRAYAGES, Amiens (FR)

(72) Inventors: Laurent Caumartin, Amiens (FR); Rabah Arhab, Amiens (FR); Taemann Kim, Amiens (FR); Herve Ribot, Amiens (FR); Alexandre Guilhem, Amiens (FR); David Delplace, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 16/627,208

(22) PCT Filed: Jun. 29, 2018

(86) PCT No.: PCT/FR2018/051608
§ 371 (c)(1),
(2) Date: Dec. 27, 2019

(87) PCT Pub. No.: WO2019/002790
PCT Pub. Date: Jan. 3, 2019

(65) Prior Publication Data
US 2020/0116213 A1 Apr. 16, 2020

(30) Foreign Application Priority Data
Jun. 30, 2017 (FR) .................................. 1756225

(51) Int. Cl.
*F16D 48/02* (2006.01)
*F16D 25/12* (2006.01)

(52) U.S. Cl.
CPC ............. *F16D 48/02* (2013.01); *F16D 25/12* (2013.01); *F16D 2048/0224* (2013.01);
(Continued)

(58) Field of Classification Search
CPC .............................................. F16D 2048/0239
See application file for complete search history.

(56) References Cited

U.S. PATENT DOCUMENTS

2015/0308517 A1 10/2015 Jones
2016/0084325 A1 3/2016 Arhab et al.

FOREIGN PATENT DOCUMENTS

DE 10 2008 005 239 A1 7/2009
EP 2 998 602 A1 3/2016

OTHER PUBLICATIONS

International Search Report dated Dec. 7, 2018 in PCT/FR2018/051608 filed Jun. 29, 2018.

*Primary Examiner* — Timothy Hannon
(74) *Attorney, Agent, or Firm* — Oblon, McClelland, Maier & Neustadt, L.L.P.

(57) ABSTRACT

The invention concerns a hydraulic pump (6, 7) for a clutch mechanism (1) of a vehicle transmission, the hydraulic pump (6, 7) comprising a body (60, 70) in which there are formed a chamber (61, 71), an inlet opening (62, 72) through which a hydraulic fluid can enter the chamber (61, 71), and an outlet opening (63, 73) through which the hydraulic fluid can leave the chamber (61, 71), the chamber (61, 71) receiving at least one hydraulic wheel of the hydraulic pump (6, 7), the inlet opening (62, 72) and the outlet opening (63, 73) each opening into the chamber (61, 71) of the body (60, 70), the body (60, 70) of the hydraulic pump (6, 7) being delimited by an outer edge (80) on which at least one peripheral groove (81, 82) is formed, configured to receive a gasket (83, 84), the gasket (83, 84) being intended to provide contact sealing between the body (60, 70) of the hydraulic pump (6, 7) and a hydraulic connection interface (4) of the clutch mechanism (1).

15 Claims, 7 Drawing Sheets

(52) U.S. Cl.
CPC .. *F16D 2048/0239* (2013.01); *F16D 2300/26* (2013.01); *F16D 2500/1026* (2013.01)

HYDRAULIC PUMP FOR A HYDRAULIC CONNECTION INTERFACE OF A CLUTCH MECHANISM

The present invention concerns the field of clutch mechanisms for vehicles. More particularly, the present invention concerns the field of hydraulic pumps for clutch mechanisms, and the field of hydraulic connection interfaces for such clutch mechanisms.

A dual wet clutch mechanism mainly comprising a torque transmission module, a clutch housing and a servo control hydraulically controlling the clutches of the clutch mechanism are known from document EP 2 998 602 A. In this document, the torque transmission module is partially housed in the clutch housing of the clutch mechanism, and a passage is provided in the clutch housing for mechanically and hydraulically connecting this torque transmission module to the servo control. Such a torque transmission module is formed by a flange and a cover that together define a clutch chamber housing the clutches of the clutch mechanism.

Hydraulic pumps are intended to be mounted on the torque transmission module of the clutch mechanism. In order to distribute the pressurized hydraulic fluid delivered by the hydraulic pumps, the hydraulic pumps are connected to a device for distributing the hydraulic fluid formed in the flange of the torque transmission module. More particularly, such hydraulic pumps connected to the device for distributing the hydraulic fluid of the torque transmission module are formed by a first low-pressure hydraulic pump intended to lubricate the clutches of the clutch mechanism, via the device for distributing the hydraulic fluid, and a second high-pressure hydraulic pump intended to actuate the clutches of the clutch mechanism by means of pistons, via the device for distributing the hydraulic fluid.

During the assembly of such a mechanism, the torque transmission module previously equipped with the hydraulic pumps is housed at least partially in the clutch housing of the clutch mechanism. This is a complex assembly procedure. Indeed, during a first assembly step, it is first necessary to attach the hydraulic pumps to the torque transmission module. In a second assembly step, the clutch housing of the clutch mechanism is attached to a transmission of a motor vehicle. In a third assembly step, the torque transmission module is housed at least partially in the clutch housing of the clutch mechanism in order to be attached to the clutch housing and to the servo control.

Moreover, this solution disclosed in this document involves many structural modifications of the torque transmission module. Specifically, the flange of the torque transmission module is suitable for carrying the hydraulic pumps and the oil distribution device connected to these hydraulic pumps. These structural modifications of the torque transmission module add to space requirement of the torque transmission module, when it is housed in the clutch housing of the clutch mechanism.

The aim of the present invention is to overcome at least one of the abovementioned disadvantages and propose a specific arrangement of the clutch mechanism that helps simplify the assembly procedure while reducing the constraints and costs of manufacturing the clutch mechanism.

To this end, the invention concerns a hydraulic pump for a clutch mechanism of a vehicle transmission, the hydraulic pump comprising a body in which there are formed a chamber, an inlet opening through which a hydraulic fluid can enter the chamber, and an outlet opening through which the hydraulic fluid can leave the chamber, the chamber receiving at least one hydraulic wheel of the hydraulic pump, the inlet opening and the outlet opening each opening into the chamber of the body. In this invention, the body of the hydraulic pump is delimited by an outer edge on which at least one peripheral groove is formed, configured to receive a gasket, the gasket being intended to provide contact sealing between the body of the hydraulic pump and a hydraulic connection interface of the clutch mechanism.

It should be understood that the hydraulic pump according to the invention is intended to equip a wet clutch mechanism, i.e. a clutch mechanism supplied by pressurized hydraulic fluid such as oil for lubricating or actuating at least one clutch of the clutch mechanism, depending on the desired use. When such a clutch mechanism is a double clutch mechanism, a low-pressure pump is used to lubricate the clutches of the clutch mechanism, via the hydraulic connection interface, and a high-pressure pump is used to actuate the clutches of the clutch mechanism, via the hydraulic connection interface.

The hydraulic connection interface is intended to cooperate with the hydraulic pump of the invention, in particular by providing a pipe conveying the hydraulic fluid to and from the hydraulic pump. The hydraulic connection interface is intended to house the hydraulic pump according to the invention.

It should also be understood that the hydraulic connection interface is used to distribute the hydraulic fluid to at least one clutch of the clutch mechanism.

Such a hydraulic pump helps simplify the assembly of the clutch mechanism. Indeed, the hydraulic pump, and more particularly its body, may be housed in the hydraulic connection interface between a first part and a second part of the hydraulic connection interface. Thus, in the case of a double clutch mechanism, it is possible to provide a hydraulic connection interface comprising the hydraulic pumps previously mounted in this hydraulic connection interface. This means that, when the clutch mechanism is delivered to a client—such as a motor vehicle manufacturer—it is no longer necessary to assemble the hydraulic pumps before housing the torque transmission module in the clutch housing.

Advantageously, the hydraulic pump is a gear pump. The hydraulic wheel is then a first gear of this pump. The chamber of the body of the hydraulic pump is then configured in size to receive the gears of this pump.

Advantageously, the hydraulic pump comprises at least the hydraulic wheel.

Advantageously, the inlet opening and the outlet opening are opposite each other.

During operation, the gears of such a hydraulic pump are rotated and then generate, by vacuum, suction that draws the hydraulic fluid from the inlet opening and conveys it towards the outlet opening of the body of the hydraulic pump.

Advantageously, a first peripheral groove and a second peripheral groove are formed on the outer edge of the body of the hydraulic pump, the first peripheral groove and the second peripheral groove being configured to respectively receive a first gasket and a second gasket, the first gasket and the second gasket being intended to provide contact sealing between the body of the hydraulic pump and a hydraulic connection interface of the clutch mechanism.

It should be understood that, when the body of the hydraulic pump is housed in the hydraulic connection interface between the first part and the second part of the interface, the first gasket is intended to provide contact sealing between the body of the hydraulic pump and the first part of the hydraulic connection interface, and the second gasket is intended to provide contact sealing between the body of the hydraulic pump and the second part of the hydraulic connection interface.

It is envisaged that the first part of the hydraulic connection interface is formed together with a clutch housing of the clutch mechanism, whereas the second part of the hydraulic connection interface closes the first part of the hydraulic connection interface.

The clutch housing of the clutch mechanism may be configured to receive a torque transmission module of the clutch mechanism. Such a torque transmission module is formed by a flange and a cover that together delimit a clutch chamber housing at least one clutch of the clutch mechanism.

Advantageously, the center of the inlet opening and the center of the outlet opening of the body pass through a same axis of the openings.

The diameter of the inlet opening may be larger than the diameter of the outlet opening. As a variant, the diameter of the inlet opening may be the same as the diameter of the outlet opening. When the inlet opening and the outlet opening have the same diameter, the hydraulic connection interface may comprise means for controlling the flow rate of the hydraulic fluid.

In order to house the body of the hydraulic pump in the hydraulic connection interface, the first part of the hydraulic connection interface may comprise a first housing for receiving a first part of the body of the hydraulic pump and the second part of the hydraulic connection interface may comprise a second housing for receiving a second part of the body of the hydraulic pump, the first and second parts of the body of the hydraulic pump together forming the body.

According to one feature, the body of the hydraulic pump comprises a cylindrical base in which the chamber, the inlet opening and the outlet opening are formed. The cylindrical base may comprise an outer edge on which the first peripheral groove and the second peripheral groove that respectively receive the first gasket and second gasket are formed.

The first gasket is used to provide contact sealing between the cylindrical base of the body and the first part of the hydraulic connection interface whereas the second gasket is used to provide contact sealing between the cylindrical base of the body and the second part of the hydraulic connection interface.

Advantageously, the inlet opening and the outlet opening are formed on the body of the hydraulic pump between the first groove and the second groove. When the openings of the body are configured in this way, it should be understood that the movement of the hydraulic fluid conveyed to the chamber, and of the hydraulic fluid conveyed out of the chamber, is limited by the first gasket and the second gasket. More particularly, the first gasket and the second gasket are intended to provide sealing for the suction and discharge of the fluid to and from at least the clutch of the clutch mechanism, without generating emulsion and pressure loss.

Advantageously, the cylindrical base of the body of the hydraulic pump is circular. In this case, the first peripheral groove and the second peripheral groove are also circular.

According to one particular feature of this embodiment, the body of the hydraulic pump comprises a cover closing its cylindrical base. This cover helps form a pre-assembled assembly of the hydraulic pump that may comprise the hydraulic wheel.

According to this particular feature, it is envisaged that the body of the hydraulic pump is formed by the cylindrical base and the cover. The cylindrical base may then comprise the first groove of the body and the cover may comprise the second groove of the body.

According to another particular feature, the hydraulic pump comprises attachment means of the hydraulic pump body configured to cooperate with complementary attachment means of the hydraulic connection interface. When the attachment means of the hydraulic pump body cooperate with the complementary attachment means of the hydraulic connection interface, it should be understood that the body of the hydraulic pump is secured to the hydraulic connection interface. These attachment means of the body of the hydraulic pump and these complementary attachment means of the hydraulic connection interface may be formed by clipping means or indeed by rivets, for example. These attachment means of the body of the hydraulic pump are advantageously formed on the cylindrical base of the body.

Advantageously, the attachment means of the hydraulic pump body are in the form of bores formed in the body of the hydraulic pump and the complementary attachment means of the hydraulic connection interface are in the form of attachment holes, the bores of the body being opposite the attachment holes of the hydraulic connection interface and being configured respectively to receive an attachment screw. When the body of the hydraulic pump comprises a cylindrical base, the attachment means are formed in this cylindrical base. When the body of the hydraulic pump comprises the cover, the cover comprises passage holes opposite the attachment holes of the hydraulic connection interface in order for each to be traversed by one of the attachment screws housed in a bore of the body of the hydraulic pump.

There now follows a description of a series of features of the hydraulic pump that may be taken alone or in combination with each other.

Thus, in the case of a gear pump, the chamber may be formed by a first portion and a second portion, the first portion allowing the rotation of the hydraulic wheel, i.e. the first gear, and the second portion allowing the rotation of a second gear of the hydraulic pump.

The hydraulic pump may also comprise a drive shaft extending along an axis of rotation, on the one side being housed in the body of the hydraulic pump in order to rotate the hydraulic wheel around the axis of rotation of the drive shaft, and on the other side emerging from the body of the hydraulic pump in order to engage with a drive pinion.

The drive pinion may be configured to be coupled to a toothed belt secured to the torque transmission module of the clutch mechanism.

It is envisaged that the axis of rotation of the drive shaft is configured to be parallel to an axis of rotation of the clutch mechanism. It is also provided that the axis of rotation of the drive shaft is perpendicular to the axis of the openings.

The drive shaft of the hydraulic pump may be configured to extend beyond the hydraulic connection interface. More particularly, the drive shaft of the hydraulic pump may be configured to pass through the hydraulic connection interface and extend beyond the latter from an inlet port of the hydraulic connection interface.

According to several envisaged configurations of the drive shaft that may be taken alone or in combination with each other, it may be envisaged that:

the drive shaft is configured to pass through the first part of the hydraulic connection interface and extend beyond this first part from an inlet port of the first part on the side opposite the second part of the hydraulic connection interface, when the first part is formed together with the clutch housing, the drive shaft is configured to pass through the first part and emerge on the inside of the clutch housing, the drive shaft of the hydraulic pump is intended to pass through an inlet port of the cover of the body of the cylindrical pump, the inlet port of the first part and the inlet port of the cover are aligned with each other, the cover comprises a circular protrusion intended to be housed in the inlet port of the first part, the inlet port of the cover being formed in the circular protrusion, the drive shaft is secured with the hydraulic wheel and with the drive pinion, the drive shaft emerging from the body of the hydraulic pump comprises a conical part for receiving a complementary conical part of the drive pinion so as to engage with each other, a retaining means of the hydraulic pump is provided to retain the drive pinion, the retaining means may be formed by a clamping nut cooperating with a threaded end of the drive shaft, the threaded end follows the conical part of the drive shaft. In other words, the threaded end is created in the continuation of the conical part of the drive shaft.

In practice, when the drive shaft is configured to pass through the first part of the hydraulic connection interface and extend beyond this first part from an inlet port of the first part on the side opposite the second part of the hydraulic connection interface, and when the first part is formed together with the clutch housing, it is understood that the drive shaft emerges in the part of the clutch housing that houses the transmission module. In order to drive the hydraulic pump, the drive pinion may be coupled to a toothed belt secured to the torque transmission module of the clutch mechanism.

In order to provide high-pressure operation, the body of the hydraulic pump may be sized for high-pressure operation. More particularly, the chamber of the body of the hydraulic pump may be sized for high-pressure operation. High-pressure operation of the pump is defined as being between 2 bar and 35 bar.

In order to provide low-pressure operation, the body of the hydraulic pump may be sized for low-pressure operation. More particularly, the chamber of the body of the hydraulic pump may be sized for low-pressure operation. Low-pressure operation of the pump is defined as being between 2 bar and 15 bar.

It should be understood that size of the hydraulic pump is also determined by the size of the hydraulic wheel housed in the chamber of the body of the hydraulic pump. When the hydraulic pump is a gear pump, the gears of this pump are sized for this purpose.

According to one aspect, the invention concerns a hydraulic connection interface for a clutch mechanism of a vehicle transmission, the hydraulic connection interface comprising at least one hydraulic pump according to one of the preceding features.

Advantageously, the hydraulic connection interface comprises two hydraulic pumps according to one of the preceding features.

Advantageously, a low-pressure pump is used to lubricate at least one clutch of the clutch mechanism via the hydraulic connection interface and a high-pressure pump is used to actuate at least the clutch of the clutch mechanism via the hydraulic connection interface.

According to this aspect of the invention, the body of at least the hydraulic pump is housed in the hydraulic connection interface between a first part and a second part of the hydraulic connection interface.

It should be understood that the hydraulic connection interface is used to distribute the hydraulic fluid to at least one clutch of the clutch mechanism.

According to one feature of the connection interface, the first part of the hydraulic connection interface comprises a first housing for receiving a first part of the body of the at least one hydraulic pump and the second part of the hydraulic connection interface comprises a second housing for receiving a second part of the body of the at least one hydraulic pump, the first and second parts of the body of the at least one hydraulic pump together forming the body.

Advantageously, the first part of the hydraulic connection interface may comprise a housing for receiving the entire body of the at least one hydraulic pump.

Advantageously, the second part of the hydraulic connection interface may comprise a housing for receiving the entire body of the at least one hydraulic pump.

According to another feature of the hydraulic connection interface, the first part of the hydraulic connection interface may be formed together with a clutch housing of the clutch mechanism, whereas the second part of the hydraulic connection interface closes the first part of the hydraulic connection interface.

In a variant, the clutch housing, the first part and the second part are produced as a single part, for example by molding and/or machining. The first part comprises, for example, a skirt of the clutch housing. The second part forms, in particular, a base of the clutch housing.

The clutch housing of the clutch mechanism may be configured to house a torque transmission module of the clutch mechanism. Such a torque transmission module is formed by a flange and a cover that together delimit a clutch chamber housing at least one clutch of the clutch mechanism.

According to another feature, the first and second parts of the hydraulic connection interface are produced as a single part.

Alternatively, the first and second parts of the hydraulic connection interface form two separate parts, and a flat gasket is then arranged, for example, between the first part and the second part of the hydraulic connection interface. The flat gasket helps ensure contact sealing between the first part and the second part.

More particularly, the first part may comprise a docking plane and the second part may comprise a docking plane, the flat gasket being arranged between the docking plane of the first part and the docking plane of the second part, hydraulic conduits formed, on the one side, in the first part, opening on the docking plane of the first part, and formed, on the other side, in the second part, opening on the docking plane of the second part. It should be understood that the conduits formed on the first part and the second part of the hydraulic connection interface are used, together, to distribute the hydraulic fluid to at least one clutch of the clutch mechanism. Naturally, it is understood that the flat gasket is cut out around hydraulic conduits or other forms provided in the first and second parts of the hydraulic connection interface.

A first hydraulic conduit may be configured to convey the hydraulic fluid to the inlet opening of the at least one hydraulic pump.

A second hydraulic conduit may be configured to convey the hydraulic fluid from the outlet opening of the at least one hydraulic pump.

In a variant, the first hydraulic conduit and/or the second hydraulic conduit is formed entirely in the first part or in the second part of the hydraulic connection interface.

Advantageously, the clutch housing is configured to be mounted on a transmission housing of the vehicle.

Advantageously, at least the second part of the hydraulic connection interface comprises a pipe opening on the second hydraulic conduit. The channel of the second part advantageously extends perpendicular to the inlet opening of the body and the outlet opening of the body.

Advantageously, the channel of the second part may be configured to receive a connector that may be received in the transmission housing of the vehicle.

Advantageously, the connector housed in the channel of the second part is in the form of a pressure regulator.

Advantageously, the channel may be configured to be connected, via the transmission, to a heat exchanger of the vehicle.

Advantageously, the channel of the second part may be configured to be connected, via the transmission, to a filter filtering the hydraulic fluid of the transmission.

A first hydraulic connection plane of the hydraulic connection interface may be configured to match a first hydraulic connection plane of a hydraulic servo control. This first hydraulic connection plane allows the hydraulic connection interface and the hydraulic servo control to be connected mechanically and hydraulically.

A second hydraulic connection plane of the hydraulic connection interface may be configured to match a second hydraulic connection plane of the transmission. This second hydraulic connection plane allows the hydraulic connection interface and the transmission of the vehicle to be connected mechanically and hydraulically.

Advantageously, the second hydraulic connection plane of the hydraulic connection interface is perpendicular to the first hydraulic connection plane of the hydraulic connection interface.

According to another aspect, the invention concerns a clutch mechanism of a vehicle transmission comprising a hydraulic connection interface according to any one of the features of the aspect of the invention relating to the hydraulic connection interface.

According to a particular embodiment, the clutch mechanism comprises a clutch housing on which the hydraulic connection interface is formed, in part.

Advantageously, the clutch mechanism comprises a torque transmission module, the torque transmission module comprising a flange and a cover that together delimit a clutch chamber housing at least one clutch of the clutch mechanism, the torque transmission module being designed to be housed at least partially in the clutch housing.

Advantageously, the clutch mechanism comprises a hydraulic servo control of the clutch mechanism, the hydraulic servo control being connected to the hydraulic connection interface by the first hydraulic connection plane of the hydraulic connection interface matching a first hydraulic connection plane of the hydraulic servo control.

The servo control may advantageously comprise at least one conduit in correspondence with the first conduit for conveying the hydraulic fluid to the at least one pump.

Advantageously, the clutch mechanism is a wet clutch.

Advantageously, the clutch mechanism is of the double clutch type.

Advantageously, the clutches are arranged in a radial configuration.

Advantageously, the clutches are arranged in an axial configuration.

According to another aspect, the invention concerns a transmission assembly comprising the clutch mechanism according to any one of the features of the aspect of the invention relating to the clutch mechanism.

According to one embodiment, the transmission assembly may comprise a tank of hydraulic fluid in which the hydraulic servo control is at least partially submerged.

Other features and advantages of the invention will be further disclosed in the description that follows, and in several embodiments provided as non-limiting examples in reference to the appended schematic drawings, in which.

Hereinafter in the description, the following will be used interchangeably: the terms "hydraulic connection interface" and "interface", the terms "hydraulic pump" and "pump", the terms "hydraulic servo control" and "servo control", the terms "hydraulic connection plane" and "connection plane", and the terms "hydraulic connector" and "connector".

Figure 1:
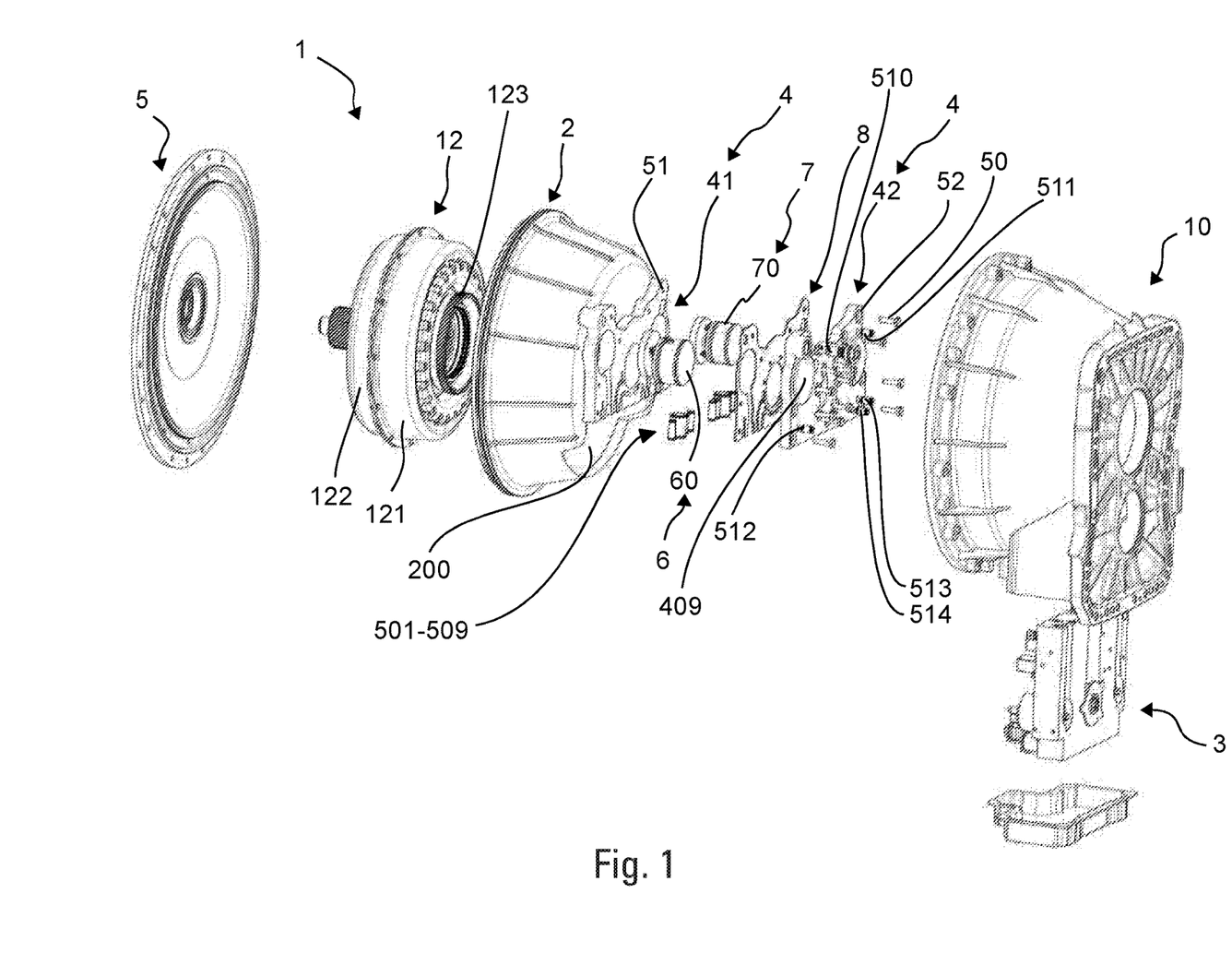
FIG. 1 shows an exploded perspective view of an assembly formed by a clutch mechanism and a vehicle transmission housing, the clutch mechanism principally comprising a clutch housing on which a hydraulic connection interface of the clutch mechanism is formed, in part, the hydraulic connection interface being formed by a first part and by a second part, a torque transmission module, a closure plate closing the clutch housing and a hydraulic servo control, the clutch mechanism being intended to be housed in the transmission housing of the vehicle.

FIG. 1 shows an assembly formed by the clutch mechanism 1 and a vehicle transmission housing 10. The clutch mechanism 1 is a wet dual-clutch mechanism for a vehicle transmission. However, the invention is not limited to such a clutch mechanism. The clutch mechanism 1 principally comprises a clutch housing 2, a hydraulic connection interface 4 of the clutch mechanism 1 formed by a first part 41 and a second part 42 closing the first part 41 of the interface 4, a torque transmission module 12, a closure plate 5 closing the clutch housing 2 and a hydraulic servo control 3. The clutch mechanism 1 is intended to be housed in the transmission housing 10. The clutch housing 2 is intended to at least partially house the torque transmission module 12. A central opening 409 passing through the interface 4 and the clutch housing 2 is intended to receive transmission shafts of the transmission. The torque transmission module 12 is intended to be mounted so as to be able to rotate freely in the clutch housing 2. Such a torque transmission module 12 is formed by a flange 121 and a cover 122 that together define a clutch chamber housing the clutches of the torque transmission module 12 of the clutch mechanism 1. The first part 41 is formed together with the clutch housing 2 and the second part 42 is intended to close the first part 41 of the interface 4. It should be understood that the clutch housing 2 and the first part 41 of the interface 4 are formed together. In other words, the clutch housing 2 and the first part 41 of the interface 4 form a one-piece component. The first part 41 may be formed by molding and/or by machining the clutch housing 2. The first part 41 of the interface 4 is formed on a rear face of the clutch housing 2, the rear face being intended to be opposite the second part 42. A hole 200 is provided in the clutch housing 2 to allow access to a part of the servo control 3 from inside the clutch housing 2 when the servo control 3 is connected to the interface 4.

The clutch housing 2 is mounted on the transmission housing 10 such that the second part 42 is then connected hydraulically to the transmission housing 10. As shown, hydraulic pumps 6, 7 of the clutch mechanism 1 are provided to equip the hydraulic connection interface 4. More particularly, a body 60, 70 of the hydraulic pumps 6, 7 is housed in the interface 4 between the first part 41 and the second part 42 of the interface 4. A first low-pressure hydraulic pump 6 is used to lubricate the clutches housed in the torque transmission module 12 of the clutch mechanism 1 and a second high-pressure hydraulic pump 7 is used to actuate the clutches housed in the torque transmission module 12 of the clutch mechanism 1. A flat gasket 8 is intended to be arranged between the first part 41 and the second part 42 of the interface 4. The flat gasket 8 that is shown, arranged between the first and second parts 41, 42 of the interface 4, provides contact sealing between these two parts 41, 42 of the interface 4.

The procedure for assembling such a clutch mechanism 1 will now be described.

In a first assembly phase, advantageously carried out before delivery to a motor vehicle manufacturer, the pumps 6, 7 are arranged at the rear face of the clutch housing 2 to be inserted into the first part 41 of the hydraulic connection interface 4. Before or after this, the flat gasket 8 is arranged on the first part 41 of the interface 4. The first part 41 is then covered by the second part 42. According to this example embodiment, the second part 42 is then screwed to the first part 41 of the interface 4 by the series of first attachment screws 50. It should be understood that this first assembly phase forms a pre-assembled sub-assembly that may be delivered to a client, such as a motor vehicle manufacturer, without the latter needing to perform these operations of mounting the hydraulic pumps 6, 7 of the clutch mechanism 1.

In a second assembly phase, the hydraulic servo control 3 is then connected to the hydraulic connection interface 4 via a first series of hydraulic connectors 501-509. The clutch housing 2 and the servo control 3 are then hydraulically connected to the transmission housing 10 via a second series of hydraulic connectors 510-514. The transmission shafts of the transmission of the vehicle then emerge, through a central opening 409, into the inside of the clutch housing 2 on the side opposite the first part 41 of the interface 4. The torque transmission module 12 is then inserted into the clutch housing 2 in order to be fixedly mounted on the latter, for example by screwing. Each connector comprises a first peripheral groove and a second peripheral groove that each receive a seal to provide sealing between each of the parts 41, 42 of the interface 4.

Figure 2:
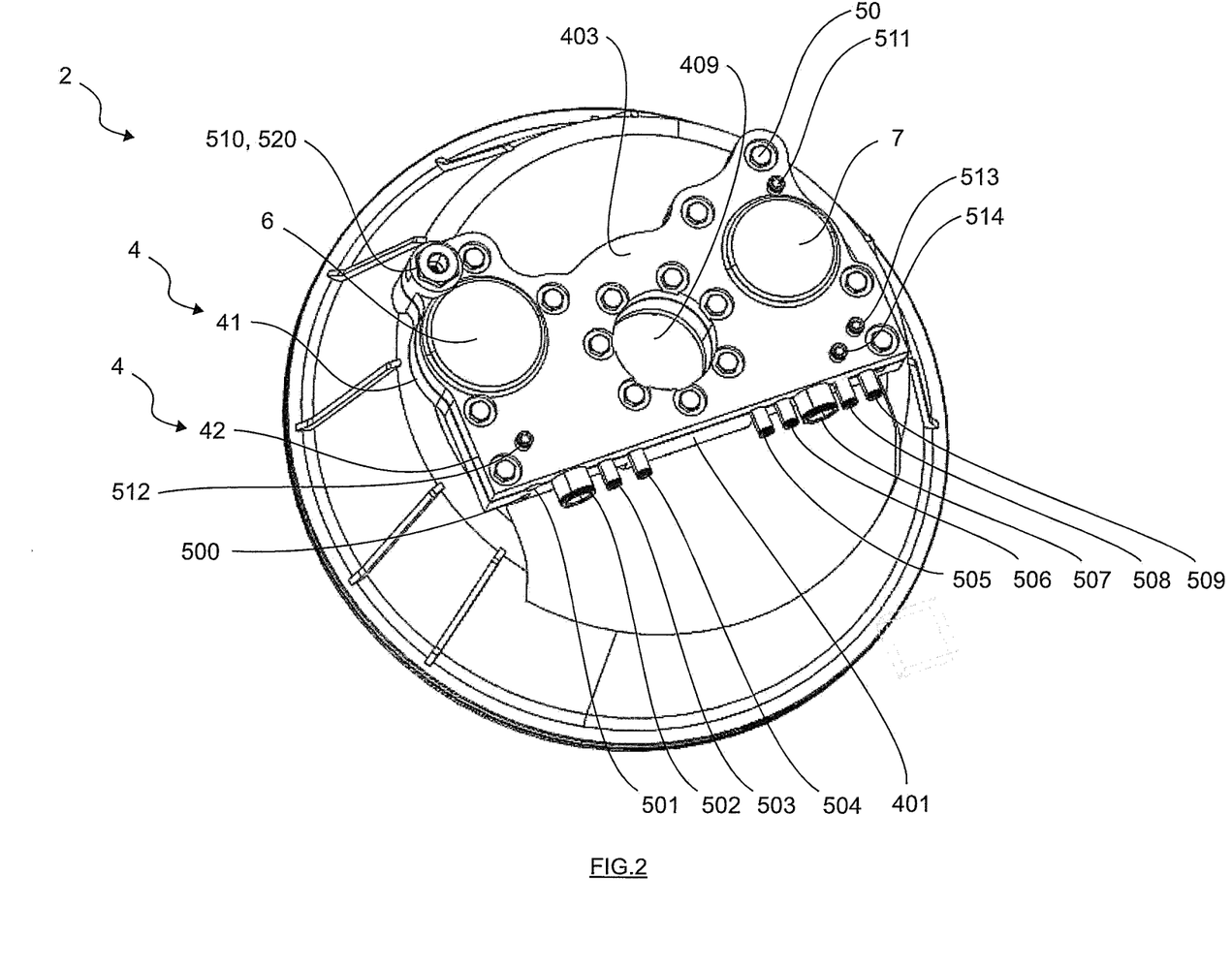
FIG. 2 shows a perspective view of the clutch housing forming a first part of the hydraulic connection interface according to the embodiment shown in FIG. 1, the clutch housing being closed by a second part of the hydraulic connection interface.

FIG. 2 shows in greater detail the clutch housing 2 on which the first part 41 of the hydraulic connection interface 4 is formed. The first part 41 and the second part 42 of the interface 4 match each other. A first hydraulic connection plane 401 of the interface 4 is shown. This first connection plane 401 is configured to match a first hydraulic connection plane 402 of the servo control 3 shown in FIG. 1. The first connection planes 401, 402 of the interface 4 and the servo control 3 allow the interface 4 and the servo control 3 to be connected mechanically and hydraulically via first retaining means 500 and the first series of hydraulic connectors 501-509. A second hydraulic connection plane 403 of the hydraulic connection interface 4 is configured to match a second hydraulic connection plane (not shown) formed on the transmission housing. The second hydraulic connection plane 403 is a plane of the second part 42 of the interface 4. The second connection planes 403 of the interface 4 and the servo control 3 allow the interface 4 and the transmission to be connected mechanically and hydraulically via the second series of hydraulic connectors 510-514. It should be noted that the first connection plane 401 of the hydraulic connection interface 4 is perpendicular to the second connection plane 403 of the hydraulic connection interface 4. Therefore, the first series of connectors 501-509 is oriented perpendicular to the second series of connectors 510-514.

The hydraulic connection interface 4 comprises the body 60 of the first hydraulic pump 6—housed in the interface 4—intended to lubricate the clutches housed in the torque transmission module 12 of the clutch mechanism 1 and the body 70 of the second hydraulic pump 7—housed in the interface 4—intended to actuate the clutches housed in the torque transmission module 12 of the clutch mechanism 1 via pistons that may be housed in the torque transmission module 12.

The first hydraulic pump 6 is intended to suck a hydraulic fluid from a first connector 502 of the first series of connectors 501-509. The hydraulic fluid discharged by the first hydraulic pump 6 is then conveyed to a first connector 510 of the second series of connectors 510-514. The hydraulic fluid sucked by the first hydraulic pump 6 is then guided, via the first connector 510 of the second series of connectors 510-514, to a heat exchanger of the vehicle in order to control the temperature of the hydraulic fluid before it is inserted into the torque transmission module 12. The first connector 510 of the second series of connectors 510-514 may be in the form of a pressure regulator 520 for regulating the pressure of the hydraulic fluid as described below.

The second hydraulic pump 7 is intended to suck a hydraulic fluid from a second connector 507 of the first series of connectors 501-509. The hydraulic fluid discharged by the second hydraulic pump 7 is then conveyed to a second connector 511 of the second series of connectors 510-514. The hydraulic fluid sucked by the second hydraulic pump 7 is then guided, via the second connector 511 of the second series of connectors 510-514, to a filter filtering the hydraulic fluid of the transmission before it is inserted into the torque transmission module 12.

A third connector 512 of the second series of connectors 510-514 allows the hydraulic fluid discharged by the low-pressure pump to be recovered after it has passed into the heat exchanger and a fourth connector 513 of the second series of connectors 510-514 allows the hydraulic fluid discharged by the high-pressure pump to be recovered after it has passed through the transmission filter. A fourth connector 514 of the second series of connectors 510-514 is also provided to convey the hydraulic fluid to a pressure accumulator of the transmission.

Figure 3A:
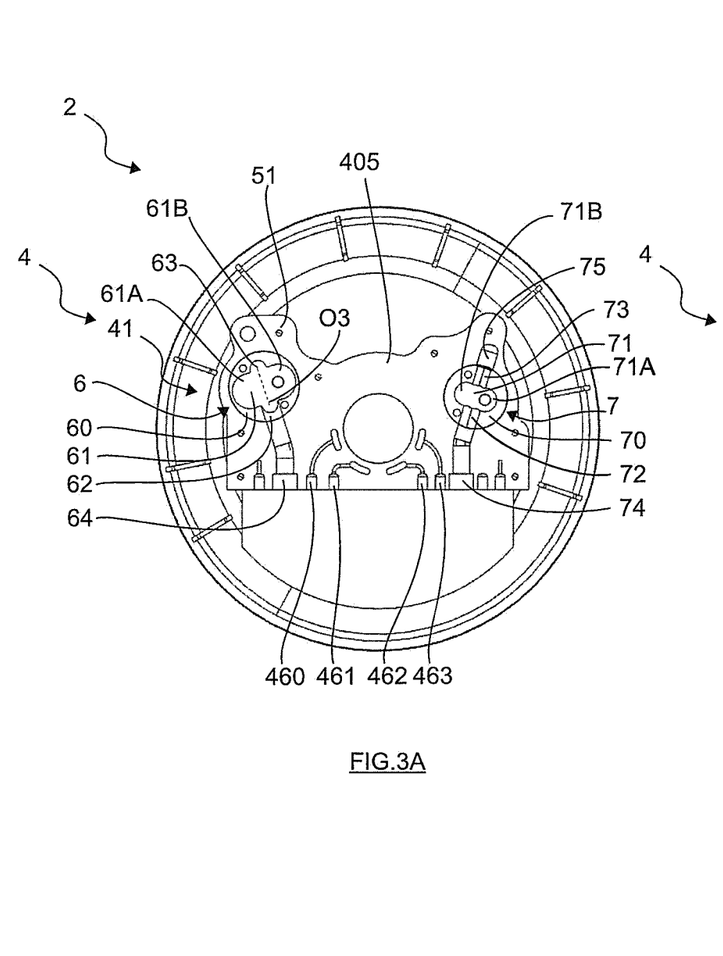
FIG. 3A shows a view of the rear face of the clutch housing shown in FIG. 2, not equipped with the second part.

FIG. 3A shows a view of the rear face of the clutch housing 2 on which the first part 41 of the hydraulic connection interface 4 is shown. The second part 42 of the hydraulic connection interface 4, the series of first attachment screws 50 attaching the second part 42 to the first part 41, and the first series of hydraulic connectors 501-509 and the second series of hydraulic connectors 510-514, have also been removed. The second part 42 of the interface 4 is shown in FIG. 3B, which shows its face that matches the first part 41.

In FIG. 3A, each pump 6, 7 comprises a body 60, 70 in which there are formed a chamber 61, 71, an inlet opening 62, 72 intended to convey a hydraulic fluid to the chamber 61, 71, and an outlet opening 63, 73 intended to convey the hydraulic fluid out of the chamber 61, 71. For each pump 6, 7, the chamber 61, 71 of the body 60, 70 receives at least one hydraulic wheel (not shown) of the corresponding pump 6, 7. It should be noted that the size of the chamber 61 of the first pump 6 is greater than that of the chamber 71 of the second pump 7, in order to ensure their respective low-pressure and high-pressure operation. It should be understood that the reason for the different sizes of the chambers 61, 71 of the pumps 6, 7 arises from the fact that the hydraulic fluid originates from a same hydraulic fluid tank (not shown). For each pump 6, 7, the inlet opening 62, 72 and the outlet opening 63, 73 are opposite each other and each open into the chamber 61, 71 of the body 60, 70. In this embodiment, the pumps 6, 7 are gear pumps, and the hydraulic wheel is then a first gear of this pump. The chamber 61, 71 of each pump 6, 7 is sized to receive gears. More particularly, the chamber 61, 71 of each pump 6, 7 is formed by a first portion 61A, 71A and a second portion 61B, 71B, the first portion 61A, 71A allowing the rotation of the hydraulic wheel, i.e. the first gear, and the second portion 61B, 71B allowing the rotation of a second gear of the hydraulic pump.

More particularly, the first portion 61A, 71A and the second portion 61B, 71B of the chamber 61, 71 respectively comprise a semi-circular section connected to each other by linear sections.

Figure 3B:
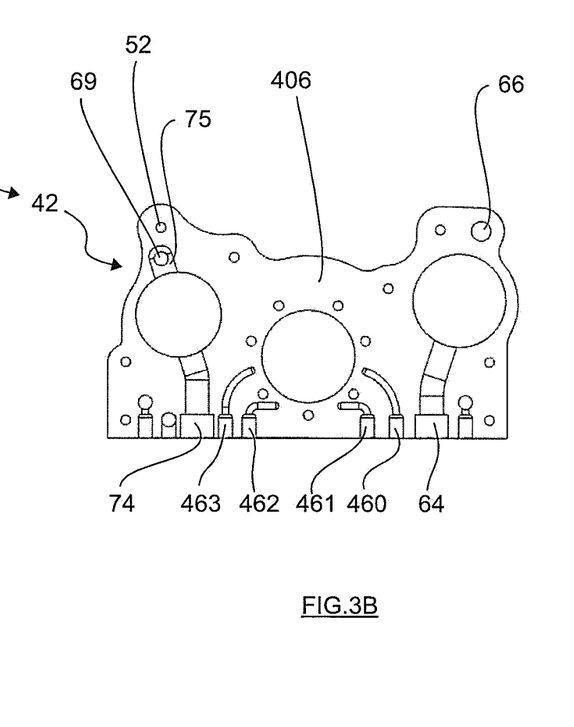
FIG. 3B shows a front view of the second part of the hydraulic connection interface.

The hydraulic fluid is inserted into the torque transmission module 12 via a series of grooves 460-463, shown in FIGS. 3A and 3B, formed partly on the first part 41 and on the second part 42 of the interface 4 and intended for this purpose.

It should be understood that the body 60, 70 of the corresponding pump 6, 7 is configured to be housed between the first part 41 and the second part 42 of the interface 4. During operation, the hydraulic wheel is rotated and generates, by vacuum, suction that draws the hydraulic fluid from the inlet opening 62, 72 of each pump 6, 7 with a view to conveying this fluid to the outlet opening 63, 73 of the body 60, 70 of the corresponding pump 6, 7. It should be noted that the body 60, 70 of each corresponding pump 6, 7 is formed such that the center of the inlet opening 62, 72 and the center of the outlet opening 63, 73 of the body 60, 70 pass through a same axis of the openings O3. In the example shown, it may be seen that the axis of the openings O3 shows the direction of flow of the hydraulic fluid entering and exiting the body of the pump 6, 7.

In reference to FIGS. 3A and 3B, the first part 41 comprises a docking plane 405 and the second part 42 comprises a docking plane 406. Hydraulic conduits 64, 74, 75 formed, on one side, in the first part 41, open on the docking plane 405 of the first part 41, and formed, on the other side, in the second part 42, open on the docking plane 406 of the second part 42. It should be understood that the docking planes 405, 406 of the first and second parts 41, 42 of the interface 4 together allow the hydraulic fluid to be distributed, via the conduits 64, 74, 75, to the clutches housed in the torque transmission module 12 of the clutch mechanism 1. It should be noted that the docking plane 405 of the first part 41 and the docking plane 406 of the second part 42 are parallel to each other. The flat gasket 8 is then arranged between the docking plane 405 of the first part 41 and the docking plane 406 of the second part 42.

For each pump 6, 7, a first hydraulic conduit 64, 74 is configured to convey the hydraulic fluid to the inlet opening 62, 72 of the corresponding pump 6, 7.

In order to convey the hydraulic fluid to the first pump 6, it is understood that the first hydraulic conduit 64 associated with the first pump 6 opens on the first connector 502 of the first series of connectors 501-509. In order to convey the hydraulic fluid to the second pump 7, it is understood that the first hydraulic conduit 74 associated with the second pump 7 opens on the second connector 507 of the first series of connectors 501-509. The first hydraulic conduits 64, 74 each have a portion at their inlet that opens on the first connection plane 401 of the interface 4 intended to receive the first connector 502 and the second connector 507 of the first series of connectors 501-509.

Figure 5:
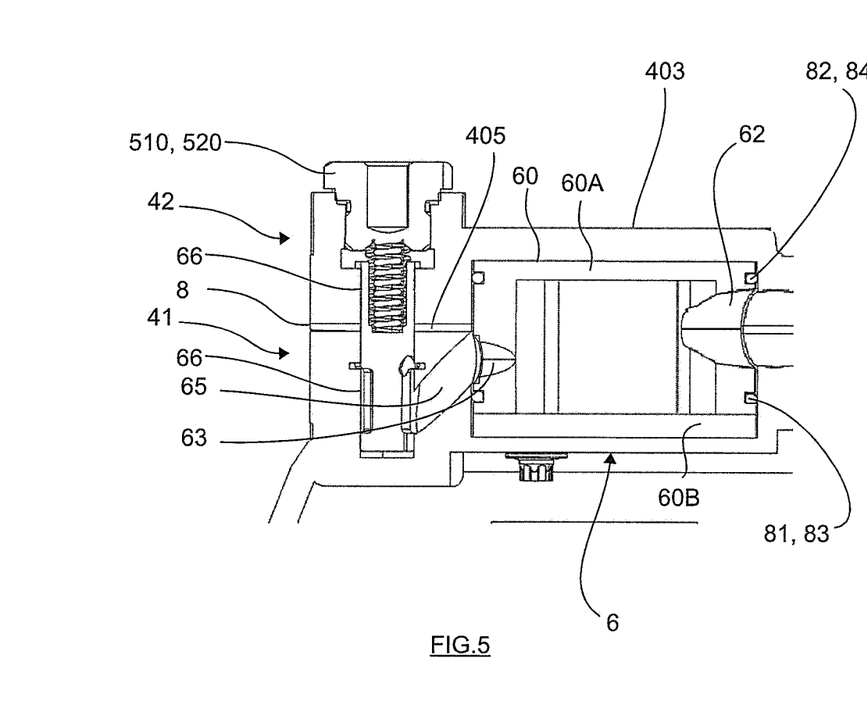
FIG. 5 shows a cross-section view of a pump connected to a connector.

As shown in FIG. 5, in order to discharge the hydraulic fluid from the first pump 6, a second hydraulic conduit 65 is formed entirely in the first part 41. The second hydraulic conduit 65 associated with the first pump 6 formed in this way is configured to convey the hydraulic fluid from the outlet opening 63 of the pump 6 to the first connector 510 of the second series of connectors 510-514.

More particularly, with respect to the first pump 6, a channel 66 formed from the second connection plane 403 of the second part 42 passes through both the first part 41 and the second part 42 of the interface 4, allowing it to open on the second conduit 65 associated with the first pump 6. This channel 66 is used to house the pressure regulator 520 associated with the first pump 6. The second conduit 65 associated with the first pump 6 is formed in the first part 41 of the interface 4, being inclined relative to the docking plane 405 of the first part 41 of the interface 4 so as to open at a bottom end of the channel 66.

In reference to FIGS. 3A and 3B, in order to discharge the hydraulic fluid from the second pump 7, a second hydraulic conduit 75 is configured to convey the hydraulic fluid from the outlet opening 73 of the pump 7 to the second connector 511 of the second series of connectors 510-514. For this purpose, a channel 69 passes through the second part 42 of the interface 4 from the second connection plane 403, opening in the second hydraulic conduit 75 of the second pump 7. This channel 69 is intended to receive the second connector 511 of the second series of connectors 510-514.

Figure 4:
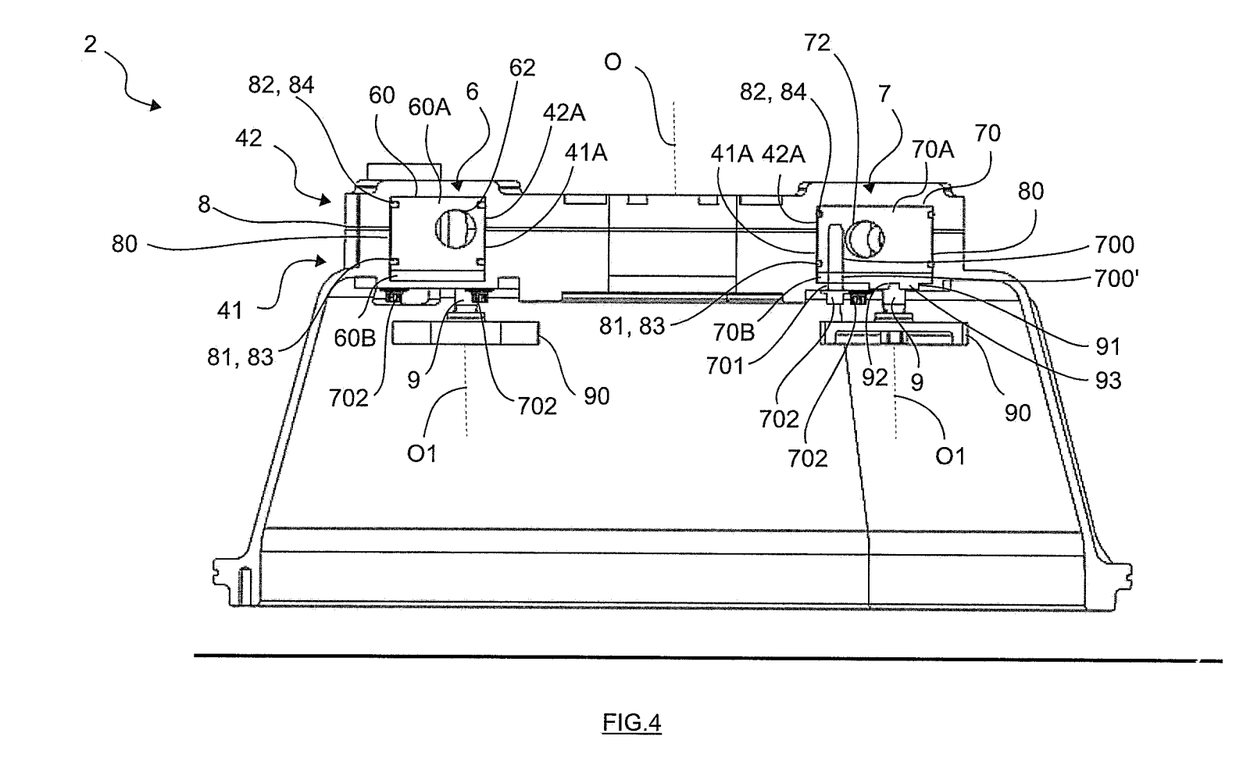
FIG. 4 shows a cross-section view of FIG. 2, displaying the pumps partially housed in the hydraulic connection interface and configured to emerge in the part of the clutch housing that houses the torque transmission module.

As shown in FIG. 4, in order to house each pump 6, 7 in the hydraulic connection interface 4, the first part 41 of the interface 4 comprises a first housing 41A for receiving a first part of the body 60, 70 of the corresponding pump 6, 7, and the second part 42 of the interface 4 comprises a second housing 42A for receiving a second part of the body 60, 70 of the corresponding pump 6, 7, the first and second parts of the body 60, 70 of the pump together forming the body 60, 70. It is thus understood that the body 60, 70 of each pump 6, 7 is shaped to match the first and second housings 41A, 42A of the interface 4.

The body 60, 70 of each pump 6, 7 will now be described in greater detail. The body 60, 70 of each pump 6, 7 comprises a circular cylindrical base 60A, 70A in which the chamber 61, 71 is formed. The body 60, 70 of each pump 6, 7 also comprises a cover 60B, 70B closing its cylindrical base 60A, 70A. The cylindrical base 60A, 70A comprises, on an outer edge 80, a first peripheral groove 81 and a second peripheral groove 82 that respectively receive a first gasket 83 and a second gasket 84. Alternatively, or additionally, one of the peripheral grooves 82, 83 may be formed on an outer periphery of the cover 60B. The first gasket 83 and the second gasket 84 of the corresponding pump 6, 7 help ensure contact sealing between the body 60, 70 of the pump 6, 7 and the parts 41, 42 of the interface 4 housing the body 60, 70 of the pump 6, 7. More particularly, the first gasket 83 and the second gasket 84 are intended to provide sealing for the suction and discharge of the fluid to and from the clutches of the clutch mechanism, without generating emulsion and pressure loss. The outlet opening 63, 73 of the corresponding pump 6, 7 may comprise a seal for preventing the hydraulic fluid from being sent towards the suction, i.e. towards the inlet opening 62, 72 of the corresponding pump 6, 7.

More particularly, for each pump 6, 7, it should be noted that the first gasket 83 is used to provide contact sealing between the cylindrical base 60A, 70A of the body 60, 70 and the first part 41 of the interface 4, whereas the second gasket 84 is used to provide contact sealing between the cylindrical base 60A, 70A of the body 60, 70 and the second part 42 of the interface 4. In reference to FIGS. 3A and 4, it is understood that the inlet opening 62, 72 and the outlet opening 63, 73 are formed on the body 60, 70 of each pump 6, 7 between the first peripheral groove 81 and the second peripheral groove 82. This configuration advantageously helps limit the expansion of the hydraulic fluid towards the inlet opening 62, 72.

When the body 60, 70 of each pump 6, 7 is housed in the first and second housings 41A, 42A of the interface 4, attachment means 700 of the pump 6, 7 are used to secure the body 60, 70 of the corresponding pump 6, 7 with the interface 4. In the embodiment shown, these attachment means 700 of the body 60, 70 of the corresponding pump 6, 7 are configured to cooperate with complementary attachment means 701 of the interface 4. More particularly, these attachment means 700 are formed on the cylindrical base 60A, 70A of the body 60, 70 of the corresponding pump 6, 7 and are in the form of bores formed in the body 60, 70 of the pump and the complementary attachment means 701 of the hydraulic connection interface 4 are in the form of attachment holes, the bores of the body 60, 70 being opposite the attachment holes of the hydraulic connection interface 4 and being configured respectively to receive an attachment screw 702. Additionally, the cover 60B, 70B of the corresponding pump 6, 7 comprises passage holes 700' opposite the attachment holes of the hydraulic connection interface 4 in order for each to be traversed by one of the attachment screws 702 housed in a bore of the body 60, 70 of the hydraulic pump. For each of the pumps 6, 7, two attachment screws 702 are provided, for example.

As shown in FIG. 4, it is understood that, in this embodiment, the pumps 6, 7 are mounted on the clutch housing 2 from the rear face of the latter, whereas the attachment screws 702 penetrate the body 60, 70 of the pump in question from inside the clutch housing 2 that houses the torque transmission module 12.

For each pump 6, 7, a drive shaft 9 of the pump 6, 7 extends along an axis of rotation O1, and is, on the one side, housed in the body 60, 70 of the pump 6, 7 in order to rotate the hydraulic wheel around the axis of rotation O1 of the drive shaft 9, and on the other side emerges from the body 60, 70 of the pump 6, 7 in order to engage with a drive pinion 90. The drive pinion 90 is configured to be coupled to a toothed belt 123 secured to the torque transmission module 12 of the clutch mechanism. It should be understood that, when the torque transmission module 12 is rotated, its rotational movement drives the drive pinion 90 of the pump 6, 7. For this reason, the drive shaft 9 of the pump in question is configured to extend beyond the hydraulic connection interface 4 and emerge, from an inlet port 91 of the first part 41 of the interface 4 and an inlet port 92 of the cover 60B, 70B of the pump in question, inside the clutch housing 2 that houses the torque transmission module 12. The axis of rotation O1 of the drive shaft 9 is thus parallel to an axis of rotation O of the clutches housed in the torque transmission module 12. It should be noted that the axis of rotation O1 of the drive shaft 9 is then perpendicular to the axis of the openings O3 of the body shown in FIG. 3A.

As shown in FIG. 4, the cover 60B, 70B of each pump 6, 7 comprises a circular protrusion 93 intended to be housed in the inlet port 91 of the first part 41 of the interface 4. In this embodiment, the inlet port 92 of the cover 60B, 70B is formed in the circular protrusion 93 such that the inlet port 92 of the cover 60B, 70B and the inlet port 91 of the interface 4 are aligned. This protrusion 93 helps form a circular shoulder between the body 60, 70 of the corresponding pump 6, 7 and the first part 41 of the interface 4. It should be understood that FIG. 4 shows a cross-section view in which only the protrusion 93 of the cover 70B of the pump 7 is shown. It is also understood that the protrusions 93 form a means for positioning and centering each pump 6, 7 on the first part 41 of the interface 4.

In order to drive the hydraulic wheel and transmit torque to it, the drive shaft 9 is secured with the hydraulic wheel and with the drive pinion 90.

Figure 6:
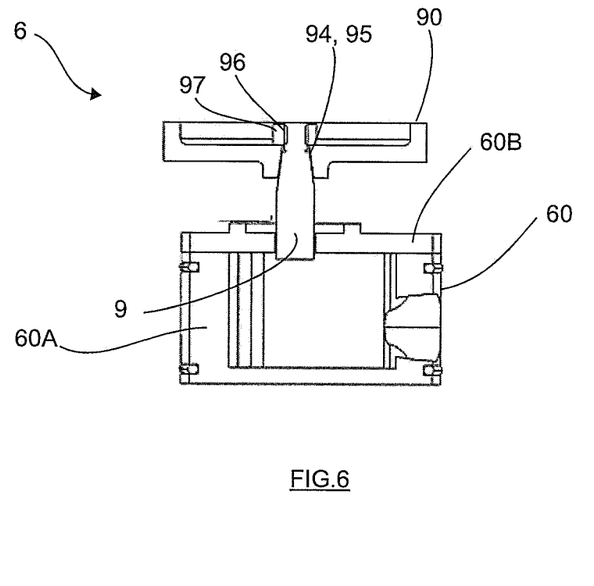
FIG. 6 shows a cross-section view of a hydraulic pump isolated from the clutch mechanism.

As shown in FIG. 6 for the first pump 6, on the side of the drive pinion 90, the drive shaft 9 emerging from the body 60 of the first hydraulic pump 6 comprises a conical part 94 for receiving a complementary conical part 95 of the drive pinion 90 so as to engage with each other. A retaining means 97 of the hydraulic pump 6 formed by a clamping nut is provided to retain the drive pinion 90. The nut is intended to cooperate with a threaded end 96 of the drive shaft 9. The threaded end 96 follows the conical part 94 of the drive shaft 9, in order to ensure the drive pinion 90 is properly retained. It is understood that the same applies to the second pump 7.

The drive shaft 9 comprises a pivot connection means (not shown). Such a pivot connection means may be formed by a bearing. Such a pivot connection may comprise sealing means for preventing the hydraulic fluid contained in the chamber 60, 70 of a pump 6, 7 from flowing out of the chamber 60, 70 via the drive shaft 9.

In this embodiment, the pivot connection means is configured to be partly secured to the cover 60B, 70B of the body 60, 70 of the hydraulic pump 6, 7, by passing through the inlet port 92 of the cover 60B, 70B of the body 60, 70.

Figure 7:
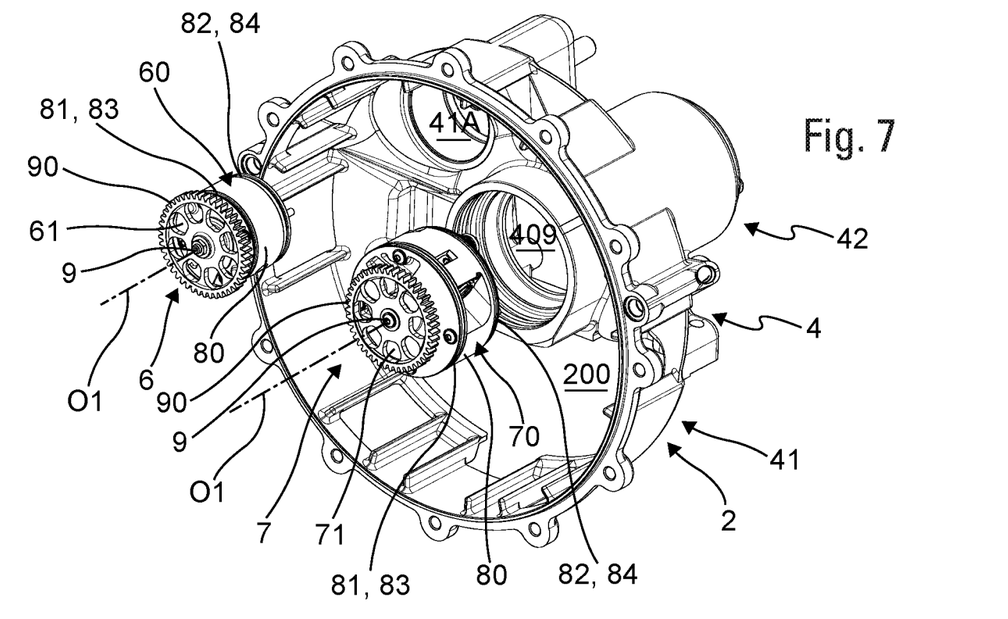
FIG. 7 shows an exploded perspective view of a hydraulic connection interface according to another embodiment of the invention.
Figure 8:
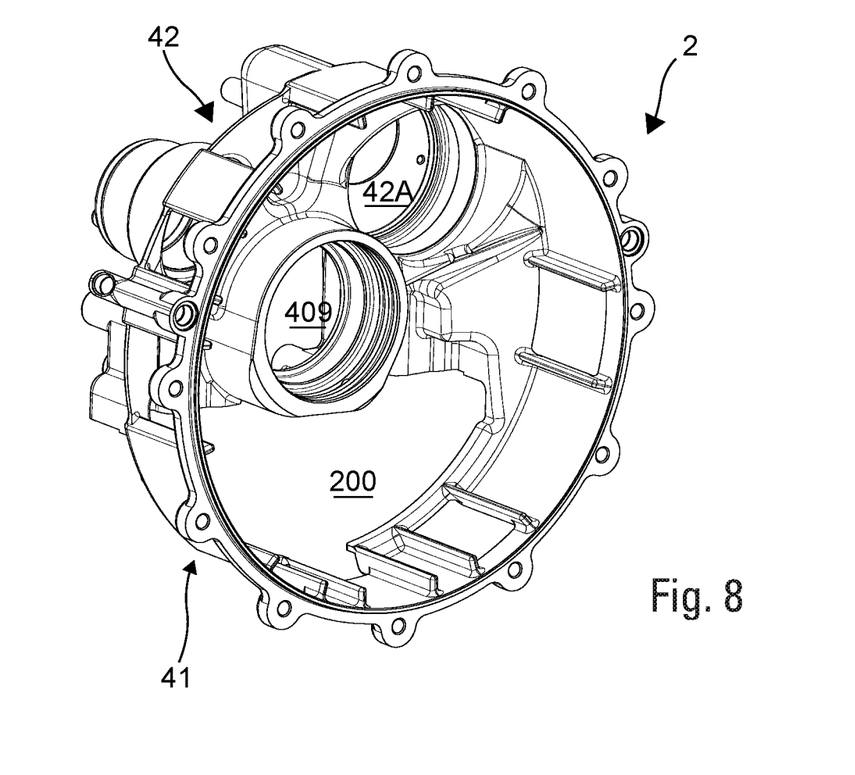
FIG. 8 shows a perspective view of the clutch housing forming the hydraulic connection interface according to the embodiment shown in FIG. 1, and FIG. 9 corresponds to FIG. 1 for an assembly comprising a hydraulic connection interface according to the embodiment of FIG. 7.

FIG. 7 shows two hydraulic pumps 6, 7 according to the first aspect of the invention before they are assembled in an interface 4 according to a second embodiment according to which the first and the second parts are produced as a single part. Therefore, in the example embodiment of FIGS. 7 and 8, the clutch housing 2, the first part comprises a skirt of the clutch housing and the second part forms a base of the clutch housing.

The hydraulic pumps 6, 7 comprise a body 60, 70 delimited by an outer edge 80 on which at least one peripheral groove is formed. In the example shown, the outer edge 80 of each pump 6, 7 comprises a first peripheral groove 81 and a second peripheral grooves 82, configured to each receive a first gasket 83 and a second gasket 84 intended to provide contact sealing between the body 60, 70 of the hydraulic pump and the hydraulic connection interface 4. Advantageously, the inlet opening and the outlet opening are formed on the body of the hydraulic pump between the first groove and the second groove.

As shown in FIG. 7, the pumps 6, 7 are arranged at the front face of the clutch housing 2 to be inserted into the first part 41 of the hydraulic connection interface 4.

Figure 9:
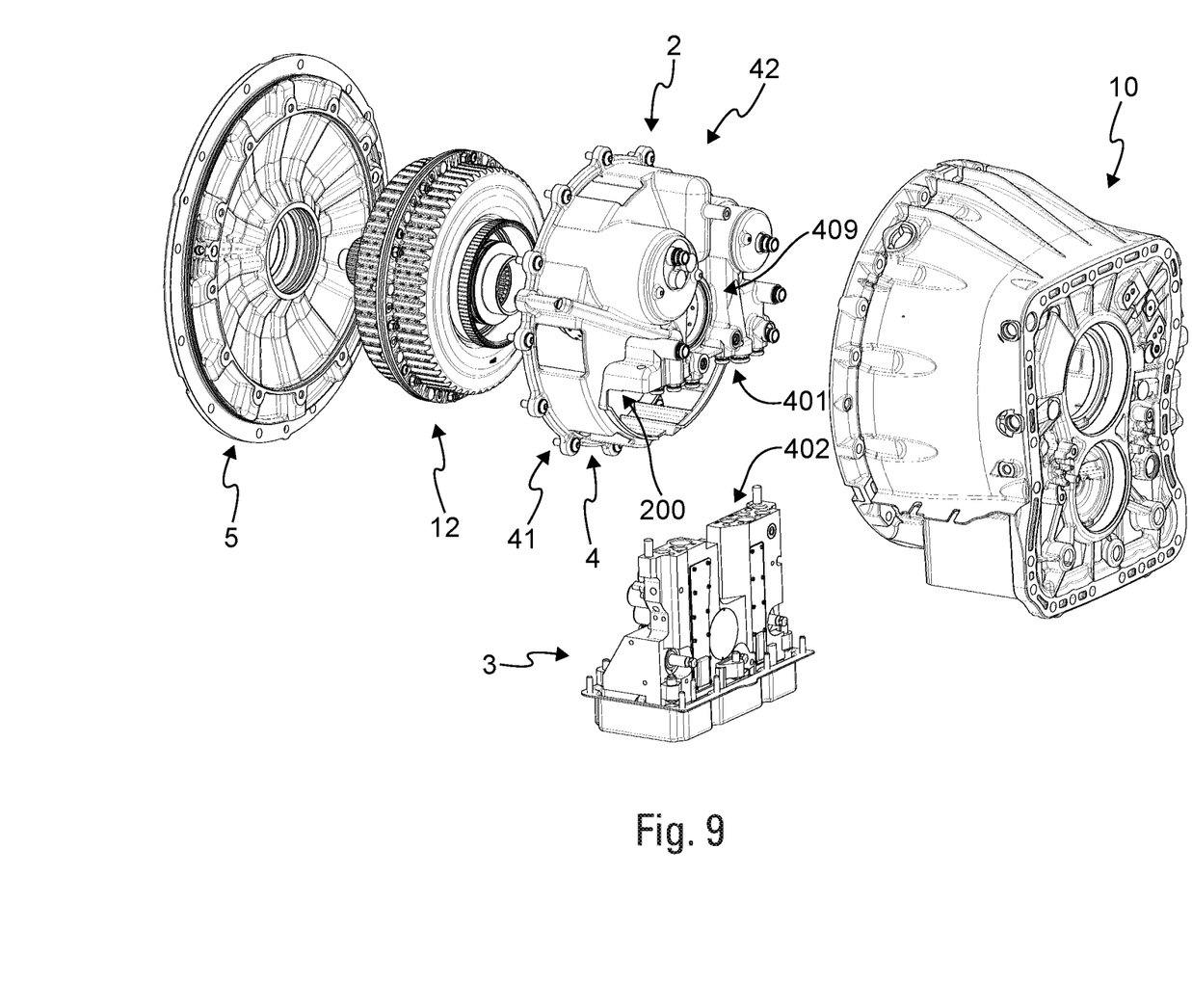

The pumps 6, 7 are thus inserted into the clutch housing 2 before a torque transmission module 12 comprising at least one clutch. This makes it possible to form a pre-assembled clutch mechanism that may be delivered to a client. Therefore, the clutch module shown in FIG. 9 comprises, in addition to the torque transmission module 12, the hydraulic connection interface 4 corresponding to FIG. 7, housing the hydraulic pumps 6, 7. In the example shown, it also comprises a hydraulic servo control 3. When it is delivered to the client, the torque transmission module 12 is, for example, housed at least partially in the clutch housing 2 closed by the closure plate 5. A central opening 409 passing through the clutch housing 2 is intended to receive transmission shafts of the transmission.

Naturally, the features, variants and different embodiments of the invention may be associated with each other in various combinations, provided they are not incompatible with or exclusive of each other. In particular, it is possible to envisage variants of the invention that only comprise a selection of the features described below in isolation from the other described features, if said selection of features is sufficient to give the invention a technical advantage over or distinguish it from the prior art.

The invention claimed is:

1. A hydraulic pump for a clutch mechanism of a vehicle transmission, the hydraulic pump comprising:
    a body in which there are formed a chamber,
    an inlet port through which a hydraulic fluid can enter the chamber, and
    an outlet port through which the hydraulic fluid can leave the chamber, the chamber receiving at least one hydraulic wheel of the hydraulic pump, the inlet port and the outlet port each opening into the chamber of the body,
    wherein the body of the hydraulic pump is delimited by an outer edge on which at least one peripheral groove is formed, configured to receive a gasket, the gasket being intended to provide contact sealing between the body of the hydraulic pump and a hydraulic connection interface of the clutch mechanism.

2. The hydraulic pump as claimed in claim 1, wherein said hydraulic pump comprises attachment means of the body of the hydraulic pump configured to cooperate with complementary attachment means of the hydraulic connection interface.

3. The hydraulic pump as claimed in claim 1, wherein said hydraulic pump comprises a drive shaft extending along an axis of rotation, on a side being housed in the body of the hydraulic pump in order to rotate the hydraulic wheel around the axis of rotation of the drive shaft, and on the other side emerging from the body of the hydraulic pump in order to engage with a drive pinion.

4. A hydraulic connection interface for a clutch mechanism of a vehicle transmission, wherein the hydraulic connection interface comprises at least one hydraulic pump as claimed in claim 1.

5. The hydraulic connection interface as claimed in claim 4, wherein the body of at least the hydraulic pump is housed in the hydraulic connection interface between a first part and a second part of the hydraulic connection interface.

6. The hydraulic connection interface as claimed in claim 5, wherein a flat gasket is arranged between the first part and the second part of the hydraulic connection interface.

7. The hydraulic connection interface as claimed in claim 6, wherein the first part comprises a docking plane and the second part comprises a docking plane, the flat gasket being arranged between the first docking plane of the first part and the docking plane of the second part, hydraulic conduits formed, on a side, in the first part, opening on the docking plane of the first part, and formed, on the other side, in the second part, opening on the docking plane of the second part.

8. The hydraulic connection interface as claimed in the claim 7, wherein a first hydraulic conduit is configured to convey the hydraulic fluid to the inlet opening of the at least one hydraulic pump.

9. The hydraulic connection interface as claimed in claim 8, wherein a second hydraulic conduit is configured to convey the hydraulic fluid from the outlet opening of the at least one hydraulic pump.

10. The hydraulic connection interface as claimed in claim 5, wherein the first part of the hydraulic interface is formed together with a clutch housing of the clutch mechanism.

11. The hydraulic connection interface as claimed in claim 10, wherein the clutch housing is configured to house a torque transmission module of the clutch mechanism.

12. A clutch mechanism of a vehicle transmission comprising a hydraulic connection interface as claimed in claim 4.

13. The clutch mechanism as claimed in claim 12, wherein said clutch mechanism comprises a clutch housing on which the hydraulic connection interface is formed, in part.

14. The clutch mechanism as claimed in claim 13, wherein said clutch mechanism comprises a torque transmission module comprising a flange and a cover that together delimit a clutch chamber housing at least one clutch of the clutch mechanism, the torque transmission module being designed to be housed at least partially in the clutch housing.

15. The clutch mechanism as claimed in claim 14, wherein said clutch mechanism comprises a hydraulic servo control of the clutch mechanism, the hydraulic servo control being connected to the hydraulic connection interface by a first hydraulic connection plane of the hydraulic connection interface matching a first hydraulic connection plane of the hydraulic servo control.

* * * * *